STRUCTURE OF CABINETS FOR ELECTRICAL APPARATUS

Filed Sept. 17, 1958

INVENTORS.
FRANCIS P. DEVINE
AND PHILIP D. REDDY,
BY Allen & Allen
ATTORNEYS.

STRUCTURE OF CABINETS FOR ELECTRICAL APPARATUS

Filed Sept. 17, 1958 2 Sheets-Sheet 2

INVENTORS.
FRANCIS P. DEVINE
AND PHILIP D. REDDY,
BY Allen & Allen
ATTORNEYS.

United States Patent Office 2,888,308

Patented May 26, 1959

2,888,308

STRUCTURE OF CABINETS FOR ELECTRICAL APPARATUS

Francis P. Devine, Lockland, and Philip D. Reddy, Cincinnati, Ohio, assignors to Avco Manufacturing Corporation, Cincinnati, Ohio, a corporation of Delaware Application September 17, 1958, Serial No. 761,612

16 Claims. (Cl. 312—310)

The invention relates to the problem of housing a large quantity of electrical or electronic equipment in a cabinet, while providing for the ready accessibility of all parts of the equipment. The invention is useful wherever such large quantities of electrical equipment are to be housed in a cabinet, especially where the front portion of the cabinet is provided with control panels or panels for equipment which must be accessible to the operator or available for viewing, such as controls, oscillograph tubes and the like. The type of electrical or electronic equipment forms no necessary limitation on the invention hereinafter described. As exemplary, although non-restrictive fields of utility, electronic computers, radar apparatus and the like may be mentioned.

It is a primary object of the invention to provide a construction which perimts maximum use of the cabinet interior while providing high accessibility of equipment mounted therein as well as equipment mounted on exterior panels.

It is an object of the invention to provide a cabinet structure for housing large quantities of electrical or electronic equipment all of which shall be available from the front.

It is an object of the invention to provide a means whereby front panel structures may be moved to new positions in which apparatus behind or extending through said front panel structures will be readily available for adjustment or repair.

It is an object of the invention to provide a new organization of parts in electrical apparatus, wherein front panel elements of a cabinet may be raised to a position above the cabinet, and swung about on a vertical axis for accessibility, without disconnection of parts.

It is an object of the invention to provide a cabinet structure including mounting means for electrical or electronic apparatus, wherein, upon the removal to new positions of front panel elements, other apparatus within the cabinet becomes accessible by sliding forwardly various frames upon which said apparatus is mounted, the structure being such that substantially the entire interior of the cabinet may be filled with apparatus all of which is selectively accessible for repair, adjustment or replacement.

It is also an object of the invention to provide a front panel structure which is movable as above indicated, but which provides a high degree of protection for sensitive servo equipment which may be mounted on the front panel.

These and other objects of the invention which will be set forth hereinafter or will be apparent to one skilled in the art upon reading these specifications, are accomplished by that construction and arrangement of parts of which an exemplary embodiment will now be described.

Reference is made to the accompanying drawings wherein Figure 1 is a partial perspective view of a portion of a cabinet showing a front panel and an alternative position for the front panel to which it may be initially moved.

Figures 1, 2, 3, 4, 5, 6, 7, 8, 14:
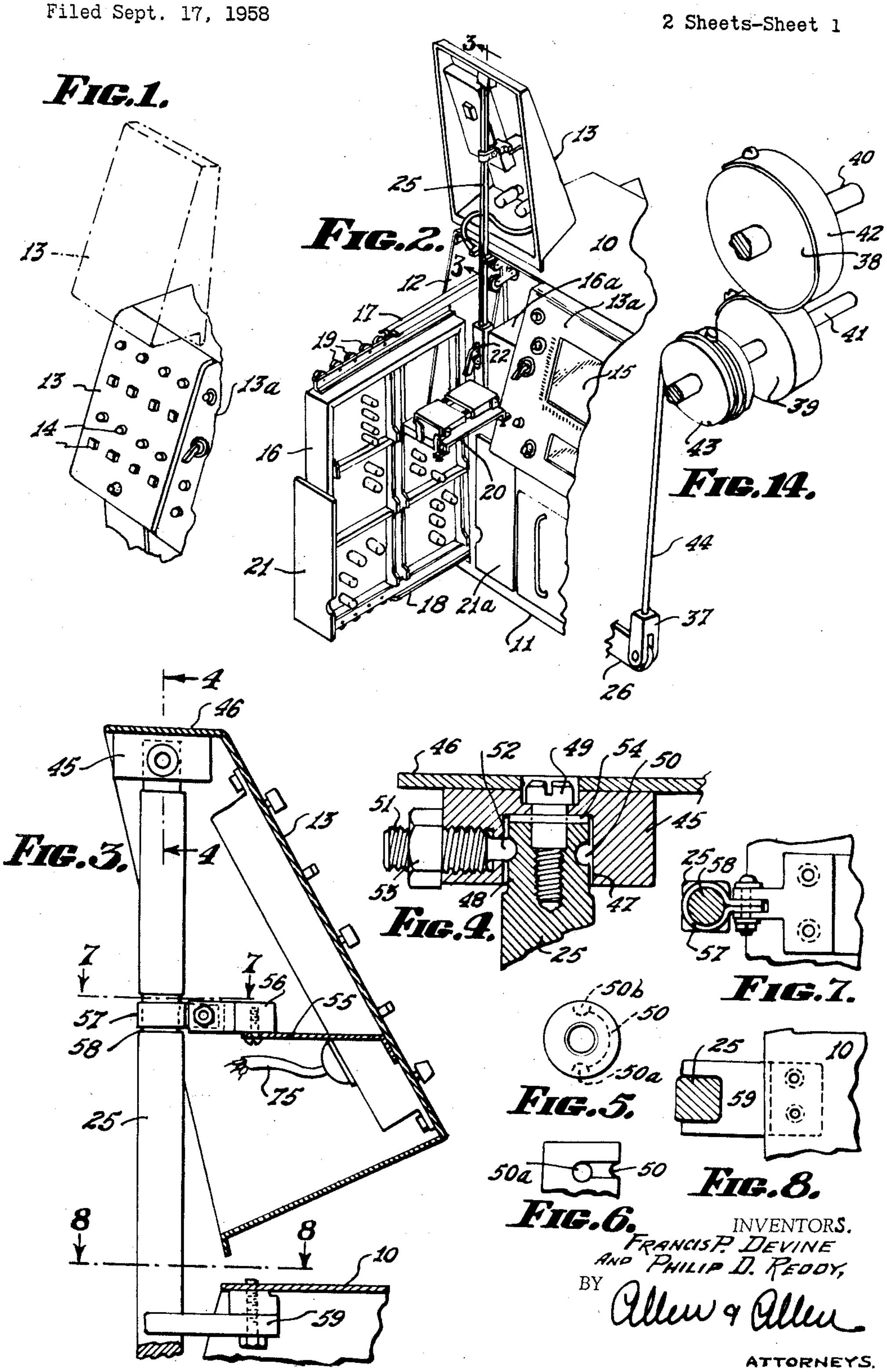
Figure 2 is a partial perspective view of a cabinet with the front panel moved upwardly to a position above the cabinet top, and swung about on a vertical axis, with a slide on which other apparatus is mounted being rendered accessible by a forward movement.
Figure 3 is a sectional view through a front panel structure and a portion of its mounting taken along the section line 3—3 of Figure 2.
Figure 4 is a partial sectional view of a top rotative mounting for a front panel structure taken along the section line 4—4 of Figure 3.
Figure 5 is a top plan view of the rod on which the front panel is swiveled.
Figure 6 is a side elevation thereof showing a control groove.
Figure 7 is a sectional view of the lower rotative connection between a front panel and its mounting rod, the view being taken along the section line 7—7 of Figure 3.
Figure 8 is a partial sectional view taken along the section line 8—8 of Figure 3.
Figure 14 is a partial perspective view of a negator spring assembly which may be used to exert force on the inner rod.

Referring first to Figures 1 and 2 there is shown a portion of a cabinet for electrical or electronic equipment, the cabinet having a top 10, a bottom 11, side members, one of which is shown at 12 and, in most instances, a back element (not shown). The lateral extent of the cabinet may be anything required to house the necessary equipment. Depending upon the width of the cabinet there will be one or more front panels 13, 13*a*, etc. A mounting will be hereinafter described for the front panel 13, it being understood that the same type of mounting may be provided for some or all of the other front panels which may be part of the cabinet.

The front panel or panels may vary as to size and shape. In the particular embodiment, the front panel is shown in the form of a hollow body the base of which is deeper than the top, so that the main surface of the front panel lies aslant to the vertical. This is a matter of convenience and design, especially where the face of the front panel is covered with control elements as diagrammatically indicated at 14 in Figure 1 or with elements which must be visible to the operator, as for example the screen 15 of Figure 2. The vertical height of the front panel with respect to the total height of the cabinet may also be varied. In the particular embodiment shown, the front panel takes up something more than about half of the vertical height of the cabinet, the remainder of the front face of the cabinet being finished off as hereinafter described.

In the practice of the invention a mounting means is provided for the front panel or panels which permits these panels to be raised bodily in the vertical direction until they clear the top of the cabinet. This is illustrated in dotted lines in Figure 1 which shows the front panel in raised position. In Figure 2 the front panel is shown swung about or swiveled on rotative supports which will hereinafter be described, so that not only does the front panel lie above the top 10 of the cabinet, but also the rear of the front panel is accessible to an operator for the repair, adjustment, or replacement of parts.

With the physical displacement of the front panel, the front portion of the cabinet is opened up as will be evident. Electrical or other apparatus within the cabinet is mounted on a series of frames 16, **16*a* etc. These frames are arranged in vertical planes; and they may be withdrawn forwardly from the cabinet while supported by track elements 17 and 18 which are slidably mounted within the cabinet, and with respect to which the vertical frames are preferably mounted by means of rollers, some of which are shown at 19**.

The arrangement of the electrical or other apparatus in the vertical frames 16 does not constitute a limitation on the present invention. The apparatus may be mounted, if desired, on tilting chassis members, one of which is shown in the tilted position at 20 in Figure 2. Such members are described in the copending application of Devine and Yeager, assigned to the same assignee, and entitled Vertical Tilt-out Chassis, Serial No. 761,613, filed September 17, 1958. It will be understood by those skilled in the art that the electrical elements on the frame members 16, **16*a* etc. may be connected to other elements within the cabinet by means of flexible conductors or separable contact elements, which will permit the described movement of the frames. It will also be seen, in the construction thus far described, that the vertical frame members 16, 16*a*** etc. may occupy substantially the entire interior of the cabinet excepting for necessary spacing between them, and may extend substantially to the full height of the cabinet, if desired, so that a very large quantity of electrical or electronic apparatus can be enclosed within a relatively small space.

It will also be evident from the construction thus far described, that the front panel elements 13, **13*a* etc. can only be closed when the vertical frame members 16, 16*a*** etc. occupy their innermost positions. The vertical frame members are usually provided with some releasable means (not shown) for retaining them in their innermost position.

In the particular embodiment, because the vertical frame members are somewhat spaced from each other laterally, panel-like elements 21, **21*a* etc. have been attached to the lower front portions of the frame elements so as more nearly to enclose that portion of the cabinet front which is not closed by the front panels 13, 13*a* etc. Any of the vertcal frame members 16, 16*a*** etc. lying behind a particular front panel may be withdrawn as shown in Figure 2 when the front panel is raised.

The mounting which permits the raising and swiveling of the front panel elements will now be described. A hollow or tubular column 22, preferably square in cross-section, and having a longitudinal slot extending nearly throughout the length of the rear face, is mounted vertically within the cabinet. This may be done by welding the lower end of the column to the base 11 or by the use of a bracket 23 or in any other suitable way. A brace 24 preferably connects an upper portion to the column to a rear part of the cabinet for greater rigidity.

A squared rod 25 slides within the column 22 and has a swiveled attachment to the front panel 13 as hereinafter described. A bracket 26 is attached to the lower end of the squared rod, and to this bracket are attached means for urging the squared rod 25 upwardly within the column 22 with a sufficient force to counterbalance the weight of the front panel structure 13. The bracket, it will be observed, has an ear extending through the slot 27 in the column. The bracket, within the column, may carry spaced rollers 28 and **28*a*, bearing on the inner wall of the column and making for a smooth sliding action of the lower end of the rod 25** therein.

The means for exerting upward force on the lower end of the rod 25 may be any appropriate means. A counterbalancing arrangement involving a cable, a sheave and a weight, while usable, is generally not preferred because of the chance of displacement of the weight, or the chance of the weight sticking in a guiding means. Self-contained spring means are more advantageous. One such means is most clearly illustrated in Figure 9. To the top 10 of the cabinet there is attached a bracket means 29 which holds two plates 30 and 31 in spaced relationship. A plurality of sheaves 32, 33, 34 and 35 are journaled between the plates as shown. To each sheave there is attached a piece of metal of elongated, leaf-spring form, having a permanent resilient set in the coiled condition. These pieces of metal are brought downwardly together as at 36, and are attached to an eye member 37 pivoted to the bracket 26. The tendency of the spring members to coil themselves on the sheaves 32, 33, 34 and 35 exerts an upward pull on the bracket 26, which may be gauged by the size and set of the springs to be enough to counterbalance the weight of the front panel 13 and its appurtenances. It will be evident, also, that fewer or a greater number of springs may be used, as desired.

Another arrangement which may be used for exerting upward force on the bracket 26 at the lower end of the rod 25 is illustrated in Figure 14. This makes use of a constant tension device which may comprise a spring arrangement of the so-called negator type. A pair of sheaves 38 and 39, affixed respectively to shafts 40 and 41 are located adjacent each other as shown, the shafts being suitably journaled on bracket means in the upper part of the cabinet. A spring element 42 is attached at its opposite ends respectively to the two sheaves. The spring has a resilient set in such a direction that it tends to coil itself about one of the sheaves, thereby rotating the shaft 41. Another sheave 43 attached to the shaft 41 has a cable 44 attached to it at one end. The other end of the cable is brought downwardly and attached to the eye 37 which in turn is pivoted to the bracket 26 on the lower end of the rod 25. It will be understood that with a suitable arrangement of the parts just outlined, an upward force can be exerted on the lower end of the rod.

The upper end of the squared rod 25 is swiveled to the front panel 13 at two points. The structure will most clearly be seen in Figures 3 to 6 inclusive. A metallic block 45 is attached to the inside surface of an upper edge portion 46 of the front panel. The block is provided with a recess 47 to accept rotatably an upper cylindrical portion 48 of the squared rod 25. If desired, the block 45 may be held rotatably to the rod by means of a screw 49, the upper edge portion 46 of the front panel being perforated to pass the screw. The cylindrical end 48 of the rod 25 is provided with a groove 50, as shown most clearly in Figure 6, are provided with depressions **50*a* and 50*b*. A set screw 51 is threaded into the block 45. It is provided with a spring-pressed nose 52 so shaped as to enter the groove 50. The position of the set screw may be fixed by a lock nut 53. The coaction of the set screw nose 52 and the groove 50 will be to confine the swiveling motion of the front panel 13 to about 180 degrees, i.e. from the position shown in dotted lines in Figure 1 to the position shown in solid lines in Figure 2. In either of these extreme positions, the nose 52 of the set screw will enter one of the depressions 50*a* or 50*b* of the groove 50, thus tending to fix the position of the front panel 13 against accidental displacement. A washer 54, preferably of the permanently lubricated type, may be interposed between the block 45 and the end of the cylindrical portion 48 of the rod 25**.

Intermediate its top and bottom portions, the front panel 13 has an inwardly extending bracket means 55, to the inner end of which is attached a member 56 bearing a fork. A sleeve member 57, the body of which surrounds a cylindrical portion 58 of the rod 25, has its ends fastened between the tines of the forked member as shown most clearly in Figures 3 and 7. This provides a second swivel mounting for the front panel on the rod, and maintains the angular relationship of the plane of the front panel to the axis of the rod.

If desired a forked member 59 may be attached as shown in Figures 3 and 8 to the underside of the top 10 of the cabinet, the rod 25 being received within the fork. This will resist the tendency for the rod 25 to tilt in a clockwise direction under the weight of the front panel when the front panel is in the position shown in Figures 2 and 3. To promote smooth sliding of the rod 25 within the column 22, bracket means 60 (Figure 9) may be attached to the top of the column. Levers 61 and 62 are pivoted to the bracket means. At their upper ends these levers carry rollers 63 bearing against the squared rod 25. At their lower ends the levers may be provided with adjusting screws 64 to insure proper contact of the rollers.

Figures 9, 10, 11, 12, 13:
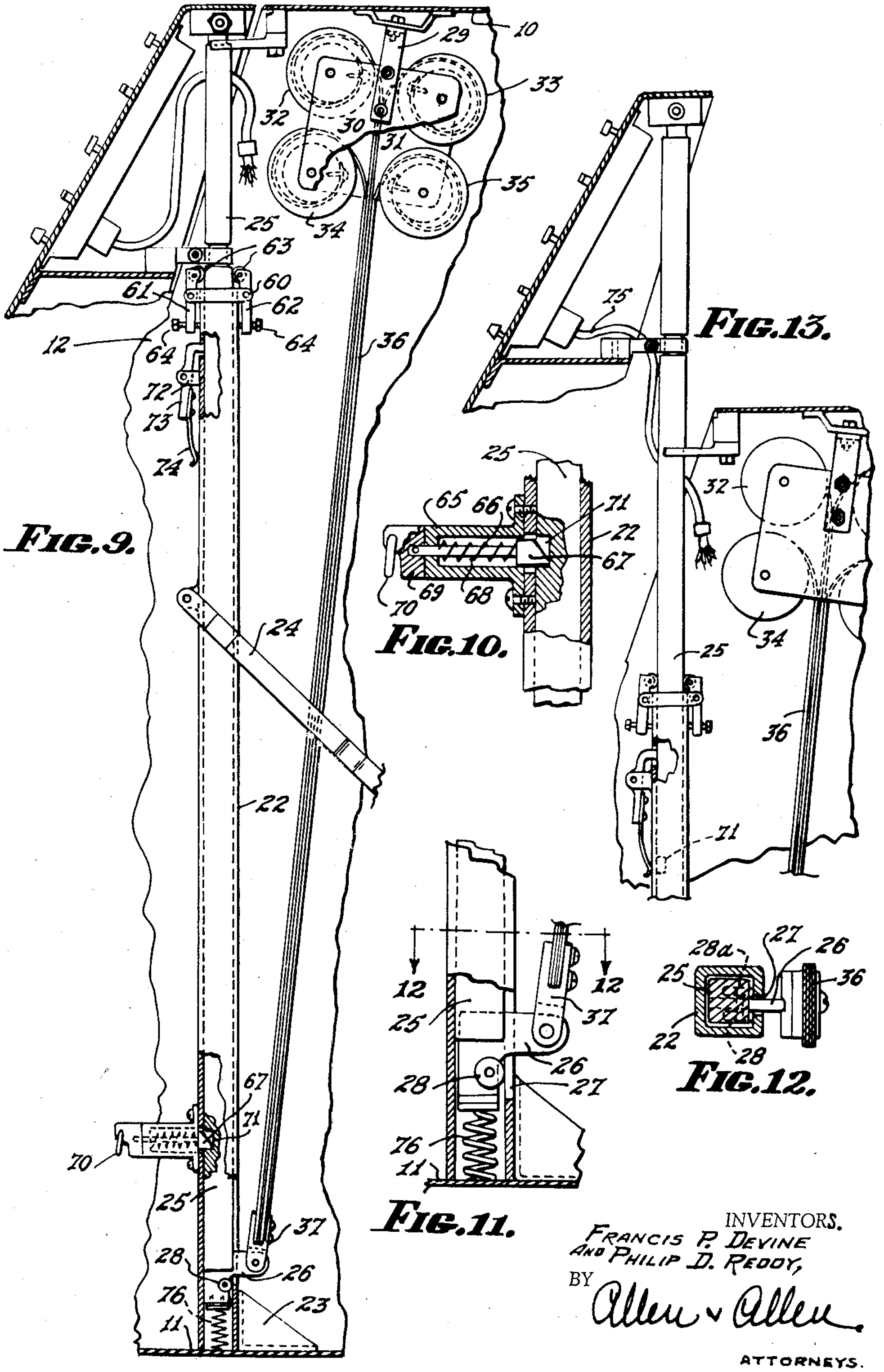
Figure 9 is a vertical sectional view through a portion of the cabinet showing in its entirety the mounting for a front panel.
Figure 10 is a partial sectional view of a latch member which may be used with front panel in closed operating position.
Figure 11 is an elevational view with parts in section showing the manner in which the spring elements are attached to the inner rod.
Figure 12 is a sectional view taken along the section line 12—12 of Figure 11.
Figure 13 is a partial elevational view showing the mounting for a front panel, where the front panel is in raised position.

In the construction described, the upward force exerted on the lower end of the squared rod 25 is preferably slightly greater than the weight of the front panel 13 and its appurtenances. A latch may be provided to hold the rod in its lowermost position in the column. This latch is illustrated in Figures 9 and 10. It comprises a housing 65 attached to the column 22. A rod 66 passes through this housing and bears on its inner end a latching element 67 having a beveled upper face as shown. A spring 68 within the housing urges the latching element to an inward or latching position through an appropriate hole in the column 22. The other end of the rod is attached to an abutment means 69 which may be provided with a ring 70 or similar means whereby it may be engaged to withdraw the latch. The latching element 67 is adapted to enter a notch 71 in the squared rod 25 when that rod is in its lowermost position. Accessibility to the latch is provided by means of mating semi-circular notches in the panels 21, **21*a* etc. (Figure 2). It is also possible to configure the latch so that the end of it extends outwardly beyond these panels as shown in Figure 9. The rod 25 will be free to slide upwardly in the column when the latch is released; and if the weight of the front panel 13 is somewhat more than counterbalanced, the rod 25 will begin to rise slowly within the column, carrying the front panel upwardly toward the position shown in dotted lines in Figure 1. A latching means may be provided to hold the rod 25 in its uppermost position. This latching means, as shown in Figure 9 comprises a bracket 72, a lever 73 pivoted to the bracket and having a latching nose, and a control spring 74, attached to the lever and bearing on the column 22. When the rod 25 is in its uppermost position, the latching nose of the lever 73, operating through a hole in the column 22, will enter the notch 71 in the rod 25**, or some other notch provided for the purpose, depending upon the extent of travel of the rod.

When the front panel has been raised to the position shown in dotted lines in Figure 1, it may thus be latched in an upward position, whereupon any of the vertical frames 16, **16*a* etc. may be withdrawn from that portion of the cabinet which lay behind the front panel. The front panel may also, as already explained, be swiveled to the position shown in Figure 2, for adjustment and the like. The electrical elements on the front panel may be connected to other elements inside the cabinet by means of a flexible, multi-lead cable 75 as will be understood by the skilled worker in the art. When the necessary repairs and adjustments have been completed, the vertical frames 16, 16*a* etc. will be slid back into the cabinet, and the front panel swiveled to the position shown in the dotted lines in Figure 1. Thereupon it is only necessary to move the front panel downwardly into its final position by a gentle force exerted thereon by the hand of the operator. In order to avoid shock as the front panel returns to closed position, and as the squared rod 25 reaches its lowermost position within the column 22, a spring 76** may be placed in the lower part of the column as shown.

Modifications may be made in the invention without departing from the spirit of it. The invention having been described in an exemplary embodiment, what is claimed as new and desired to be secured by Letters Patent is:

1. In electrical apparatus, a cabinet, a hollow column having a longitudinal slot vertically mounted within said cabinet, a front panel for said cabinet, a rod slidably mounted within said column, a connection between said rod and said front panel, and means urging said rod upwardly within said column whereby to raise said front panel above the top of said cabinet.

2. The structure claimed in claim 1 wherein said front panel is swiveled to said rod whereby, when raised above the top of said cabinet, said front panel may be swung about said rod so as to expose the rear side of said front panel.

3. The structure claimed in claim 1 wherein said panel is swiveled to said rod whereby, when raised above the top of said cabinet, said front panel may be swung about said rod so as to expose the rear side of said front panel, the connection between said rod and said front panel including means for limiting the swiveling movement of said panel to approximately 180°.

4. The structure claimed in claim 1 wherein the means for urging said rod upwardly within said column comprises at least one strip of metal having a permanent resilient set in a coiled condition, a sheave rotatably mounted on means attached to said cabinet, on which sheave said strip tends to coil, and means for transmitting the force thereby generated to the lower end of said rod in said column.

5. The structure claimed in claim 1 wherein said front panel is swiveled to said rod whereby, when raised above the top of said cabinet, said front panel may be swung about said rod so as to expose the rear side of said front panel, said means for urging said rod upwardly within said column comprising a plurality of sheaves rotatably mounted on means adjacent the top of said cabinet, a plurality of strips of spring metal having a permanent resilient set in coiled condition, each of said strips having one end attached respectively to said sheaves, the other ends of said strips being brought downwardly and attached to a bracket means having a portion extending through said slot, said bracket means being attached to the lower end portion of said rod.

6. The structure claimed in claim 1 wherein said front panel is swiveled to said rod whereby, when raised above the top of said cabinet, said front panel may be swung about said rod so as to expose the rear side of said front panel, said means for urging said rod upwardly within said column comprising a pair of sheaves located adjacent each other and in approximately the same plane and journalled to means at the top of said cabinet, and a negator spring having ends connected respectively to said sheaves whereby the tendency of said spring to coil up on one of said sheaves can cause both sheaves to rotate, and means for transferring the rotative force of one of said sheaves to an upward force effective at a lower portion of said rod.

7. The structure claimed in claim 1 in which said means for urging said rod upwardly within said column applies a force thereto greater than that required to counterbalance said front panel, and including a latching means operating through a wall of said column to engage a lower portion of said rod to hold said rod in its lowermost position in said column.

8. The structure claimed in claim 1 in which said means for urging said rod upwardly within said column applies a force thereto greater than that required to counterbalance said front panel, and including a latching means operating through a wall of said column to engage a lower portion of said rod to hold said rod in its lowermost position in said column, said rod and said column having rectangular cross sections whereby said rod is slidably but non-rotatably mounted in said column.

9. The structure claimed in claim 1 in which said means for urging said rod upwardly within said column applies a force thereto greater than that required to counterbalance said front panel, and including a latching means operating through a wall of said column to engage a lower portion of said rod to hold said rod in its lowermost position in said column, said rod and said column having rectangular cross sections whereby said rod is slidably but non-rotatably mounted in said column, and including roller means for producing a smooth sliding engagement of said rod within said column.

10. The structure claimed in claim 5 wherein the means for urging said rod upwardly within said column applies a force greater than sufficient to counterbalance said front panel, and wherein latches are provided to determine the upper and lower positions of said rod within said column.

11. In a cabinet structure for electrical apparatus the combination of a cabinet having a top, a bottom, sides and a rear element, at least one front panel adapted to cover a portion of the front of said cabinet, the interior of said cabinet being provided with at least one vertical frame slidably mounted therein, said frame adapted to contain electrical apparatus and being movable from a position within said cabinet to a position extending beyond the front thereof so as to provide access to said electrical apparatus, said frame lying normally at least partially to the rear of said front panel when said frame is in said cabinet, and means mounting said front panel for vertical movement with respect to said cabinet, to a position above the top thereof, whereby said vertical frame is rendered accessible for forward withdrawal.

12. The structure claimed in claim 11 wherein the means mounting said front panel for vertical movement include means providing for a swiveling of said front panel about a vertical axis when said front panel is in its uppermost position.

13. The structure claimed in claim 12 wherein said means mounting said front panel for vertical movement comprises a hollow column mounted within said cabinet, a rod slidable within said column, a connection between said rod and said front panel, and means for urging said rod upwardly within said column with a force at least sufficient to counterbalance said front panel.

14. The structure claimed in claim 13 including means in the connection between said rod and said front panel for limiting the swiveling movement of said front panel to approximately 180°.

15. The structure claimed in claim 14 wherein said means for urging said rod upwardly within said column comprises self-contained spring means capable of exerting on said rod a substantially constant upward force irrespective of the position of said rod within said column.

16. The structure claimed in claim 15 wherein said front panel when in its lowermost position closes only a portion of the front of said cabinet from the top thereof toward the bottom, and wherein said vertical frame carries at its front a panel member adapted to close the remainder of the front of said cabinet in a top-to-bottom direction.

References Cited in the file of this patent

UNITED STATES PATENTS

| | | |
|---|---|---|
| 1,668,566 | Link | May 8, 1928 |
| 1,860,913 | Wagenhorst | May 31, 1932 |
| 1,874,143 | Tuttle | Aug. 30, 1932 |